United States Patent
Sonoda et al.

(10) Patent No.: US 12,083,812 B2
(45) Date of Patent: Sep. 10, 2024

(54) CONTAINER BODY, LASER PROCESSING APPARATUS, AND LASER PROCESSING METHOD

(71) Applicants: Tetsuya Sonoda, Kanagawa (JP); Hiromichi Matsuda, Kanagawa (JP)

(72) Inventors: Tetsuya Sonoda, Kanagawa (JP); Hiromichi Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 136 days.

(21) Appl. No.: 18/055,423

(22) Filed: Nov. 15, 2022

(65) Prior Publication Data
US 2023/0150288 A1 May 18, 2023

(30) Foreign Application Priority Data
Nov. 17, 2021 (JP) .................................. 2021-187026

(51) Int. Cl.
*B41M 5/26* (2006.01)
(52) U.S. Cl.
CPC ................................. *B41M 5/267* (2013.01)
(58) Field of Classification Search
CPC .......... B41J 2/442; B41J 2/4753; B41M 5/24; B41M 5/26; B41M 5/267; B29C 49/4273; B29C 2795/007; B29L 2031/7158; Y02W 30/62
See application file for complete search history.

(56) References Cited

U.S. PATENT DOCUMENTS

| | | | |
|---|---|---|---|
| 5,832,344 | A | 11/1998 | Munakata |
| 2018/0009234 | A1* | 1/2018 | Ohi ........................ B41J 2/4753 |
| 2021/0402805 | A1 | 12/2021 | Tamura et al. |
| 2022/0097414 | A1 | 3/2022 | Hirayama et al. |
| 2022/0118553 | A1 | 4/2022 | Miyanishi et al. |

FOREIGN PATENT DOCUMENTS

| | | |
|---|---|---|
| EP | 3118007 A1 | 1/2017 |
| EP | 3670198 A1 | 6/2020 |
| JP | 9-160432 | 6/1997 |
| JP | 2012-071473 | 4/2012 |
| JP | 2021-176648 | 11/2021 |
| JP | 2022-015739 | 1/2022 |
| JP | 2022-035975 | 3/2022 |

(Continued)

OTHER PUBLICATIONS

Extended European search report issued on Mar. 22, 2023, in corresponding European patent Application No. 22206821.5, 8 pages.

*Primary Examiner* — Anh T Vo
(74) *Attorney, Agent, or Firm* — XSENSUS LLP

(57) ABSTRACT

A laser processing apparatus includes: a conveyor to convey a container containing a content in a container body in a conveying direction at a predetermined conveying speed; and a light emitter to emit laser light to a predetermined processing region in the container body conveyed in the conveying direction by the conveyor. A frequency of a vibration of the container body conveyed, in which an amplitude of the vibration of the container body is maximized, is v/L or less, where v is the predetermined conveying speed, and L is a length of the predetermined processing region in the conveying direction.

7 Claims, 6 Drawing Sheets

(56) References Cited

FOREIGN PATENT DOCUMENTS

| | | |
|---|---|---|
| JP | 2022-035976 | 3/2022 |
| JP | 2022-056333 | 4/2022 |
| JP | 2022-057612 | 4/2022 |
| JP | 2022-058127 | 4/2022 |
| JP | 2022-086838 | 6/2022 |

\* cited by examiner

CONTAINER BODY, LASER PROCESSING APPARATUS, AND LASER PROCESSING METHOD

CROSS-REFERENCE TO RELATED APPLICATIONS

This patent application is based on and claims priority pursuant to 35 U.S.C. § 119(a) to Japanese Patent Application No. 2021-187026, filed on Nov. 17, 2021, in the Japan Patent Office, the entire disclosure of which is incorporated by reference herein.

BACKGROUND

Technical Field

The present disclosure relates to a container body, a laser processing apparatus, and a laser processing method.

Related Art

Recently, plastic wastes have caused ocean plastic pollution. Activities to reduce or eliminate plastic wastes are intensified worldwide. A plastic bottle such as a polyethylene terephthalate (PET) bottle is a cause of the plastic wastes. However, a large amount of the plastic bottles for beverage is produced, sold, and used because the plastic bottle has advantages in distribution, sale, and storage.

Most PET bottles for beverage have a label attached on the PET bottles for the purpose of product management and sales promotion. Such a PET bottle for beverage having the label is collected for the purpose of recycling to reduce the environmental load after consumers consume the content of the PET bottle. Recycling the PET bottle for beverage is referred to as "bottle to bottle" which promotes circular recycling (FIG. 1). In the circular recycling of the PET bottle for beverage, a used PET bottle is separated and collected, converted into flakes as a raw material of the PET bottle by a recycler, and reproduced as the PET bottle. In particular, proper separation and collection of the used PET bottle facilitates the circular recycling. The PET bottle includes a bottle body, a label, and a cap, and each material thereof is different from each other. Thus, the bottle body, the label, and the cap are properly separated and collected for the circular recycling. A consumer peels the plastic label of the plastic bottle by manual work, and it is inconvenient for the consumer.

SUMMARY

An embodiment of the present disclosure provides a laser processing apparatus includes: a conveyor to convey a container containing a content in a container body in a conveying direction at a predetermined conveying speed; and a light emitter to emit laser light to a predetermined processing region in the container body conveyed in the conveying direction by the conveyor. A frequency of a vibration of the container body conveyed, in which an amplitude of the vibration of the container body is maximized, is v/L or less, where v is the predetermined conveying speed, and L is a length of the predetermined processing region in the conveying direction.

Further, an embodiment of the present disclosure provides a laser processing method includes: conveying a container body containing content in a container in a conveying direction at a predetermined conveying speed of a conveyor; and emitting laser light to a predetermined processing region of the container body conveyed by the conveying A frequency of a vibration of the container body conveyed, in which an amplitude of the vibration of the container body is maximized, is v/L or less, where v is the predetermined conveying speed, and L is a length of the predetermined processing region in the conveying direction.

Further, an embodiment of the present disclosure provides a container body processed by the laser processing apparatus has the predetermined processing region processed at the frequency of the vibration of the container body to be v/L or less.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
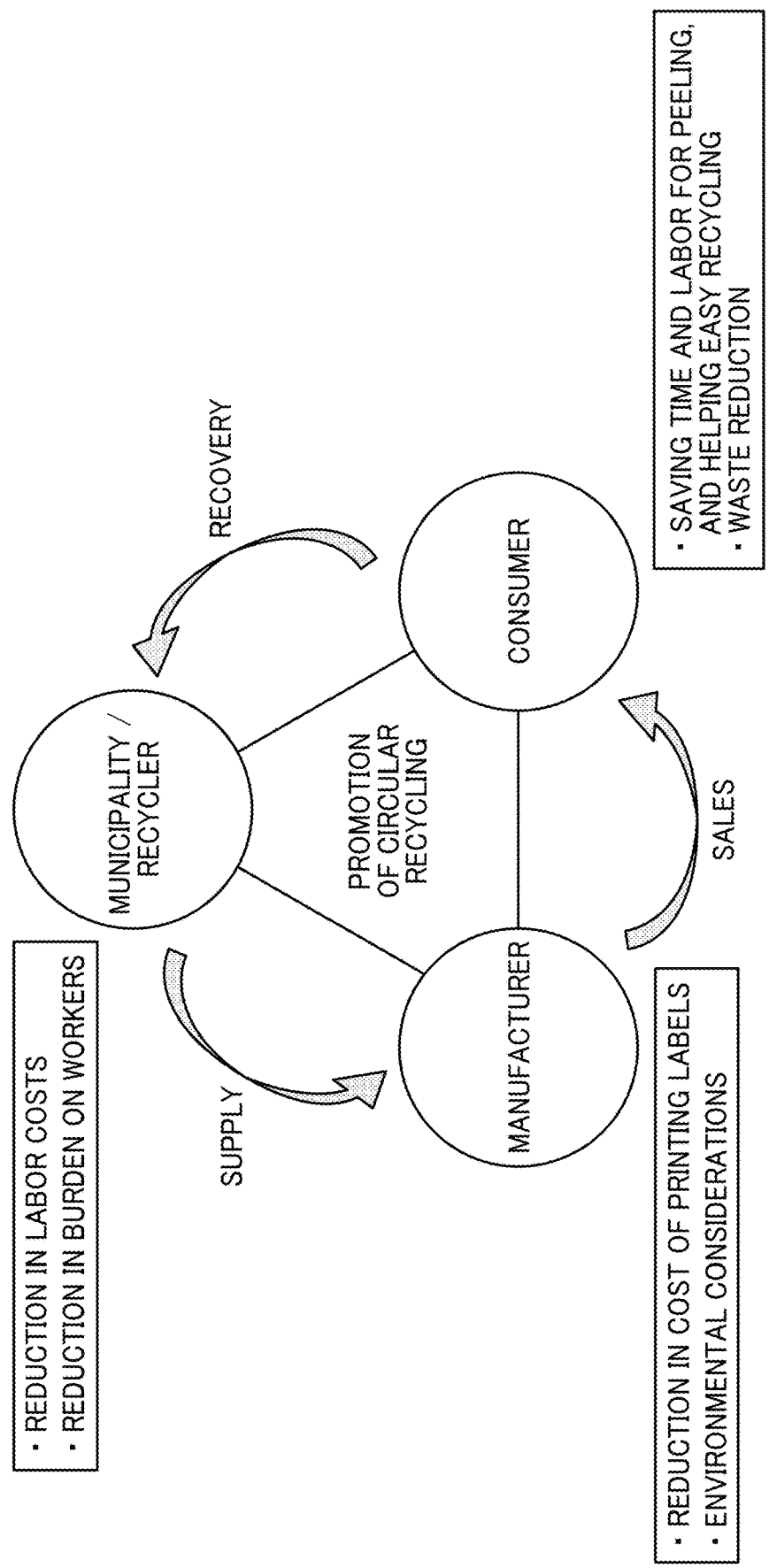
FIG. 1 is a diagram of the circular recycling of the PET bottle.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

According to embodiments of the present invention, a laser processing apparatus and a laser processing method to form an image with higher resolution on a container body that vibrates while forming the image are provided.

There is a technique to directly form (i.e., print or process) a character, a number, a symbol, an image, or other patterns on the plastic bottle (e.g., PET bottle) by the laser (i.e., laser marking method) in order to achieve label-less.

Such a laser marking method forms a hazy mark on the surface of the PET bottle by a laser beam (i.e., laser light or laser emission) and scans the PET bottle with the laser beam by turning on and off the laser beam to form an image composed of dots (i.e., the hazy marks) on the surface of the PET bottle. When the PET bottle, which is the object to be processed, vibrates, the relative position between the PET bottle and the spot of the laser beam is changed. Thus, the spot of the laser beam (i.e., laser light) does not hit a target position and the dot position is periodically changed. As a result, the image density is changed (i.e., density variation), and the image quality is decreased.

Laser Processing Apparatus and Laser Processing Method

A laser processing apparatus according to the present embodiment includes a conveyor to convey a container body in which the container contains a content, a light emitter to emit the container being conveyed by the conveyor with laser light, and may further include other units depending on applications. In the laser processing apparatus according to the present embodiment, preferably, a frequency that maximizes an amplitude of vibration of the container generated while conveying is smaller than or equal to v/L, where v is a conveying speed of the container body (i.e., v has the unit of mm/s), and L is a length (i.e., width) in the processing region in the conveying direction of the container body (i.e., L has the unit of mm).

A laser processing apparatus includes: a conveyor to convey a container containing a content in a container body in a conveying direction at a predetermined conveying speed of a conveyor; a light emitter to emit laser light to a predetermined processing region in the container body conveyed in the conveying direction by the conveyor; and circuitry to control the predetermined conveying speed of the conveyor and the predetermined processing region in the container body to control a frequency of a vibration of the container body, in which an amplitude of the vibration of the container body is maximized, to be v/L or less, where v is the predetermined conveying speed, and L is a length of the predetermined processing region in the conveying direction.

The laser processing method of the present embodiment includes conveying a container body in which the container contents content, and a light emission step to emit a laser light to the container body being conveyed, and may further include other steps depending on applications. In the laser processing method according to the present embodiment, preferably, a frequency that maximizes an amplitude of vibration of the container body generated while conveying is smaller than or equal to v/L, where v is a conveying speed of the container body (i.e., v has the unit of mm/s), and L is a length in the processing region in the conveying direction of the container body (i.e., L has the unit of mm). A laser processing method includes: conveying a container body containing content in a container in a conveying direction at a predetermined conveying speed; emitting laser light to a predetermined processing region of the container body conveyed by the conveying; and controlling the predetermined conveying speed of the conveyor and the predetermined processing region in the container body to control a frequency of a vibration of the container body, in which an amplitude of the vibration of the container body is maximized, to be v/L or less, where v is the predetermined conveying speed, and L is a length of the predetermined processing region in the conveying direction.

A container body processed by the laser processing apparatus has the predetermined processing region processed at the frequency of the vibration of the container body to be v/L or less.

The laser processing method of the present embodiment is suitably performed by the laser processing apparatus according to the present embodiment. The light emission step is performed by the light emitter. The conveying step is performed by the conveyor. The other steps may be performed by other means.

For example, in an image forming apparatus (e.g., inkjet printer), since a recording media to be printed vibrates, a relative positional displacement occurs between an ink ejection head and the recording media, an unevenness of the image density (image density variation) is caused by a periodical displacement of the ink landing position. The unevenness of the image density is hard to remove. The vibration of the container body is caused by the ease of shaking (i.e., vibration characteristics) of the container body and a load input from the outside. (1) A natural frequency is present in vibration characteristics, and relatively larger vibration (i.e., resonance) occurs when a load in the vicinity of the natural frequency is input. (2) When the laser marking method is applied to a larger number of container bodies being conveyed at a higher speed on a production line, the container bodies are less likely to convey without generating a load on the container bodies. Thus, a load is generated in a wider range of frequencies, and an influence of a load such as an impact force cannot be avoided. Thus, due to (1) and (2), the vibration in the production process of the container body is hard to avoid.

In the present embodiment, preferably, a frequency that maximizes an amplitude of vibration of the container body generated while conveying is smaller than or equal to v/L, where v is a conveying speed of the container body (i.e., the unit is mm/s), and L is a length in the processing region of the container body in the conveying direction (i.e., the unit is mm). Accordingly, the higher resolution image is formed (printed) even if the container body to be processed vibrates while conveying.

In one aspect of the present invention, the vibration of the container body being conveyed is vibration accompanied by deformation of the container body. In the laser processing apparatus, the vibration of the container body deforms the container body. The vibration of a container body such as a PET bottle is roughly classified as a motion of the rigid body (i.e., rigid body motion) with respect to the deformation vibration of the container body without deformation in the plane. The vibration may have a peak in the lower frequency band than the frequency of the vibration of the deformation. When the peak of the larger vibration is simply lowered, the vibration of the rigid body motion becomes a unique target, and the frequency of the deformation vibration affecting the image density variation is deviated from the target to be within the target frequency range, and the image density variation may occur. Preferably, the frequency is smaller than or equal to v/L with respect to the vibration accompanied by the deformation of the container body rather than the vibration of the rigid body motion.

In one aspect of the present invention, preferably, the frequency at which an amplitude of vibration of the container body generated while conveying is maximized is v/(u/3) or more, where u is the unit length. Specifically, u is 1 mm. In the laser processing apparatus, the circuitry controls the predetermined conveying speed and the predetermined processing region to control the frequency to be v/(u/3) or more, where u is a unit length.

According to the embodiment, the image density variation in which there are three cycles or more per 1 mm is hard for the human to visually recognized by the sensory evaluation. The same effect can be obtained when the frequency at which the amplitude of the vibration of the container body generated while conveying is maximized is v/(u/3) or more (the unit of v is mm/s).

According to one aspect of the present invention, a holder is provided. The holder holds the circumferential surface of the container body so as to cover the circumferential surface of the container body. The laser processing apparatus further includes a holder configured to hold a circumference surface of the container body. According to the aspect, since the vibration generated on the circumferential surface of the container body is reduced or eliminated, and the larger peak of vibration is lowered, the rigidity of the container body is increased. As a result, the frequency at which the container body resonates due to an external force (i.e., a natural frequency) is increased.

In some embodiments, the conveyor may include a holder, and the holder and the conveyor may be integrated with each other or separated members. In some embodiments, when the holder holds the PET bottle and is disposed on the conveyor, the holder holding the PET bottle works as an integral member.

In one aspect of the invention, a contact part is provided with the holder. The contact part contacts at least one portion of a circumferential surface of the container. In the laser processing apparatus, the holder includes a contact part to contact a portion of the circumference surface of the container body. According to the aspect, by increasing the rigidity of the PET bottle while decreasing or eliminating the amplitude of vibration of a portion in which the amplitude of the vibration of the container body is larger, the resonance frequency due to an external force is increased. In addition, when the laser marking is performed while rotating the container, the moment of inertia is adjusted by changing the kind or the number of the contact parts, and thus the container is easy to rotationally drive.

Light Emitter

The light emitting step is a step in which the laser emitter emits the laser light to the container body in which the container contains the content. Preferably, the laser light source emits pulse laser light. The laser light source emits the laser light having an output power (i.e., light intensity) suitable for changing the property of at least one of the surface or the inside of the container body. In the laser light source, turning on and turning off the laser emission, frequency and the intensity of the laser beam are controlled. For example, the laser light source has a wavelength of 355 nm to 1064 nm, a pulse width of 1 picoseconds (ps) to 10 nanoseconds (ns), and an average power of 10 W to 50 W. The spot diameter of the laser light on which a portion of the container body is processed is preferably from 1 μm or larger to 200 μm or smaller, more preferably from 10 μm or larger to 100 μm or smaller. The light scanner includes a deflector and an imaging optical element and scans the container with the laser light. An example of the deflector includes a galvano scanner. An example of the imaging optical element includes an fθ lens.

Container Body

The container body includes a container, a content stored in the container, and a sealing to seal the content in container, and other parts according to applications.

Container

The container includes the container body. The material, shape, size, structure, and color of the container body may be appropriately selected according to applications and are not particularly limited thereto. The material of the container body may be appropriately selected according to applications and is not particularly limited thereto. Examples of the material include resin, glass, or metals. Among these materials, resin and glass, specifically, transparent resin and glass are preferable, and the transparent resin is more preferable. Preferably, biodegradable resin may be used in recycling. Preferably, 100% biodegradable resin is used for the container. However, about 30% biodegradable resin may be used for the container. The environmental load is reduced by using such biodegradable resin. Examples of the resin of the container body include polyvinyl alcohol (PVA), polybutylene adipate terephthalate (PBAT), polyethylene terephthalate succinate, polyethylene (PE), polypropylene (PP), polyethylene terephthalate (PET), polyvinyl chloride (PVC), polystyrene (PS), polyurethane, epoxy, bio polybutylene succinate (PBS), butylene adipate co-terephthalate (PBAT), polyethylene-starch blend, poly(butylene succinate-co-terephthalate), polylactic acid (PLA), poly(3-hydroxybutyrate-co-3-hydroxyhexanoate) (PHBH), polyhydroxyalkanoate (PHA), Bio-PET 30, Bio-polyamide (PA) 610, 410, and 510, Bio-PA1012 and 10T, Bio-PA11T, MXD10, Bio polycarbonate, Bio polyurethane, Bio-Polyethylene, Bio-PET100, Bio-PA11, Bio-PA1010. These may be used alone or in combination thereof. Among these resins, biodegradable resins such as polyvinyl alcohol, polybutylene adipate terephthalate, and polyethylene terephthalate succinate are preferable in terms of the environmental load.

The shape of the container body may be appropriately selected according to applications and is not particularly limited thereto. Examples of the shape of the container body include bottle-shaped, prism-shaped, cylinder-shaped, box-shaped, or cone-shaped. Among these materials, resin is preferable. The bottle-shaped container body (i.e., bottle) has a finish portion (i.e., spout), a shoulder portion integrated with the finish portion, a sidewall portion integrated with the shoulder portion, and a bottom portion integrated with the sidewall portion. The size of the container body may be appropriately selected according to applications and not particularly limited thereto. The structure of the container body is not particularly limited and may be appropriately selected depending on applications. For example, the container body may have a single-layer structure or a multi-layer structure. Examples of the color of the container body include colorless and transparent, colored and transparent, and colored and opaque.

Content

Examples of the content include a liquid, a gas, and a granular solid. Examples of the liquid include water, tea, coffee, black tea, and soft drink. When the content is a liquid beverage, it often has a color such as transparent, white, black, brown, or yellow. Examples of the gas include oxygen, hydrogen, and nitrogen. Examples of the granular solid include, pieces or granules of fruits, vegetables, nata de coco, tapioca, jelly, konjac (konnyaku, yam cake).

Sealing

The sealing seals the content in the container and is referred to as a container cap or a cap of the container. The material, shape, size, structure, and color of the sealing may be appropriately selected according to applications and are not particularly limited thereto.

A material of the sealing (i.e., sealing material) may be appropriately selected according to applications and is not particularly limited thereto. Examples of material include resin, glasses, metal, and ceramics. Among these materials. resin is preferably used in terms of mouldability. The sealing material of resin may be the same with material examples of the container body described above The color of the sealing may be, for example, colored opaque, or colored transparent. The shape and size of the sealing may be appropriately selected according to applications, as long as the sealing seals the open or the content in the container body and are not particularly limited thereto.

The structure of the sealing may be appropriately selected according to applications and is not particularly limited thereto. For example, the sealing body preferably has a first portion that separates from the container body when the sealing is opened and a second portion that remains on the container body. Preferably, the first portion has a jagged portion on the surface as an anti-slip portion when opening the sealing. Preferably, the second portion has no jagged portion and a flat surface.

Conveying Step and Conveyor

The conveying step is a step of conveying a container body containing the content by the conveyor. An example of the conveyor includes a belt conveyor.

Other Steps and Other Means

Other steps are not particularly limited and may be appropriately selected depending on the intended purpose. An example of other steps includes a control step. Other units are not particularly limited and may be appropriately selected depending on the intended purpose. An example of the other units includes a control unit (controller or circuitry).

Embodiments of the present invention will be described in detail with reference to the drawings. In the drawings, the same components are denoted by the same reference numbers, and redundant description may be omitted. In addition, the number, position, shape of the constituent members described below are not limited to those in the present embodiment, and can be set to the number, position, shape preferable for carrying out the present invention.

First Embodiment

Figure 2:
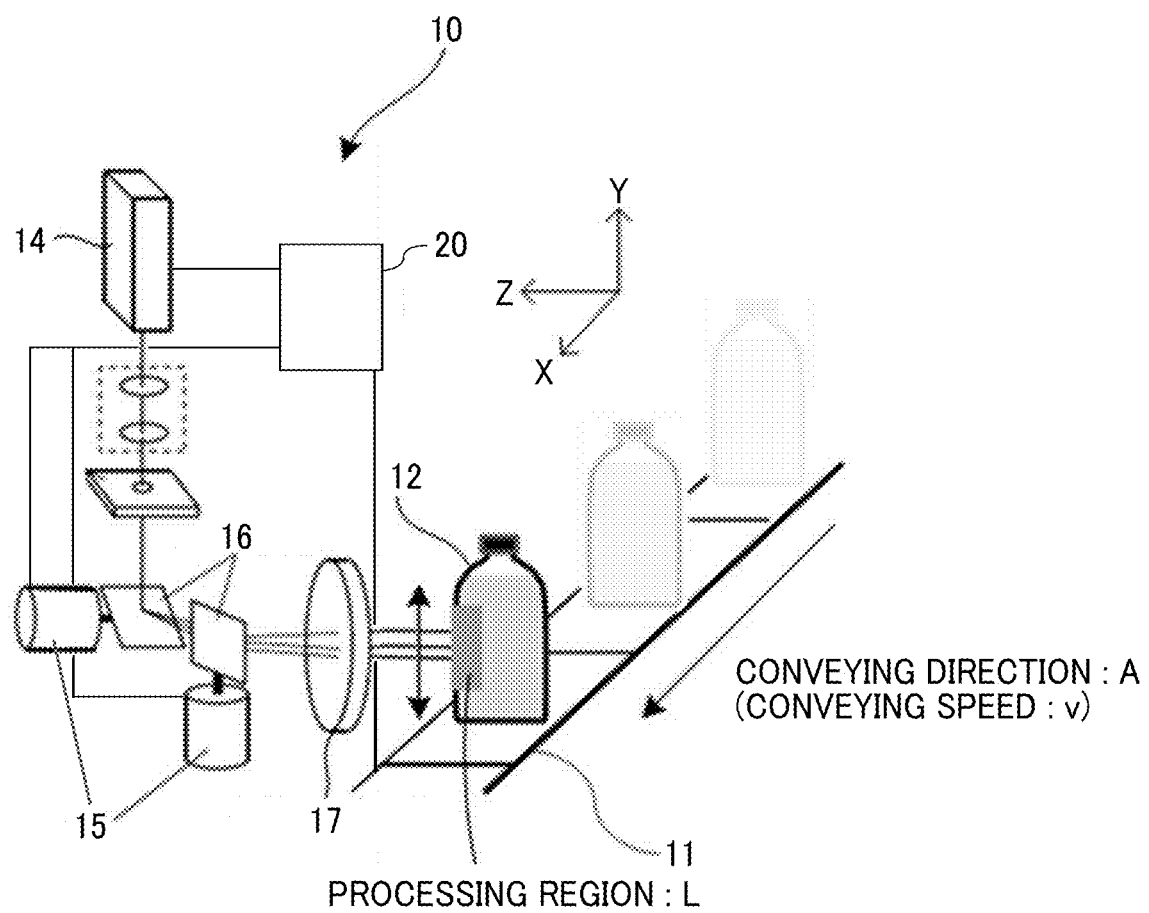
FIG. 2 is a diagram of the laser processing apparatus according to the first embodiment.

FIG. 2 is a diagram of an example of a laser processing apparatus for the container according to the sixth embodiment. The laser processing apparatus 10 according to the first embodiment includes a conveyor 11 and a light emitter including a laser oscillator 14, a galvano scanner 15, a mirror 16, an fθ lens 17, and circuitry 20. In the laser processing apparatus 10, the conveyor 11 conveys the container body 12 in the conveying direction A, the galvano scanner 15 and the mirror 16 scans the container body 12 being conveyed with the laser light by turning on and off the laser light to form the image including dots on the surface of the container body in the processing region L. As a result, the image is formed on the surface of the container body 12.

Second Embodiment

Figure 3:
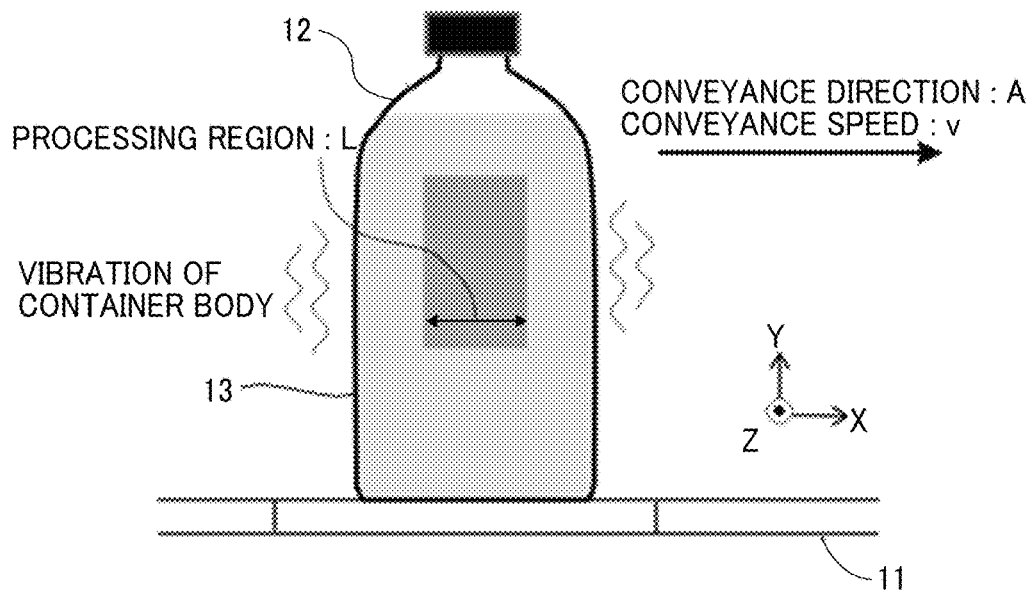
FIG. 3 is a diagram of a processing region of the container body in the conveying direction according to the second embodiment.

FIG. 3 is a diagram of a processing region in the conveying direction of the container body according to the second embodiment. The processing time for the processing region L of the container body takes the time (L/v), where L (mm) is the processing region of the container body in the conveying direction A and v (mm/s) is the conveying speed. When the frequency at which the amplitude of the vibration of the container body 12 is maximized is v/L or less, the cycle of the vibration is reduced to one or less for processing the processing region L in the conveying direction A within the time (L/v). Thus, even if the density variation of the image occurs in the conveying direction A, the cycle of the density variation is one or less within the processing region L. As a result, the image density variation recognizable for the human is reduced, and the image is formed without impairing the visibility of information and the design property.

Third Embodiment

Figure 4:
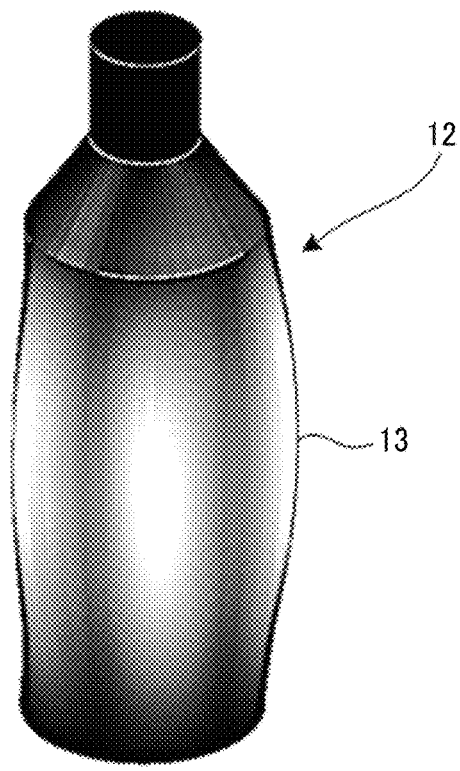
FIG. 4 is a diagram of deformation and a vibration pattern of the container body according to the third embodiment.

FIG. 4 is a diagram of the vibration pattern of the container body according to the third embodiment. In the container body 12 according to the third embodiment illustrated in FIG. 4, a white or whitish portion represents a larger amplitude of the vibration, and a black or a darker portion represents a smaller amplitude of the vibration. In many cases, the vibrational behavior of the frequency that maximizes the amplitude of the vibration of the container body 12 is rigid body motion without deformation. However, actually, since the container body locally vibrates in the processing region L, the container body preferably has a shape so that the frequency of the vibration accompanied by the deformation vibration behavior of the container body is v/L or less. By the contrast, in a case where the frequency is not v/L or less, the frequency that maximizes the amplitude of the vibration of the container body may be v/(u/3), where u is the unit length. Specifically, u is 1 mm. In the present embodiment, the image density variation is eliminated or reduced because the human eye does not recognize the image density variation of three cycles or more per 1 mm.

Fourth Embodiment

Figure 5:
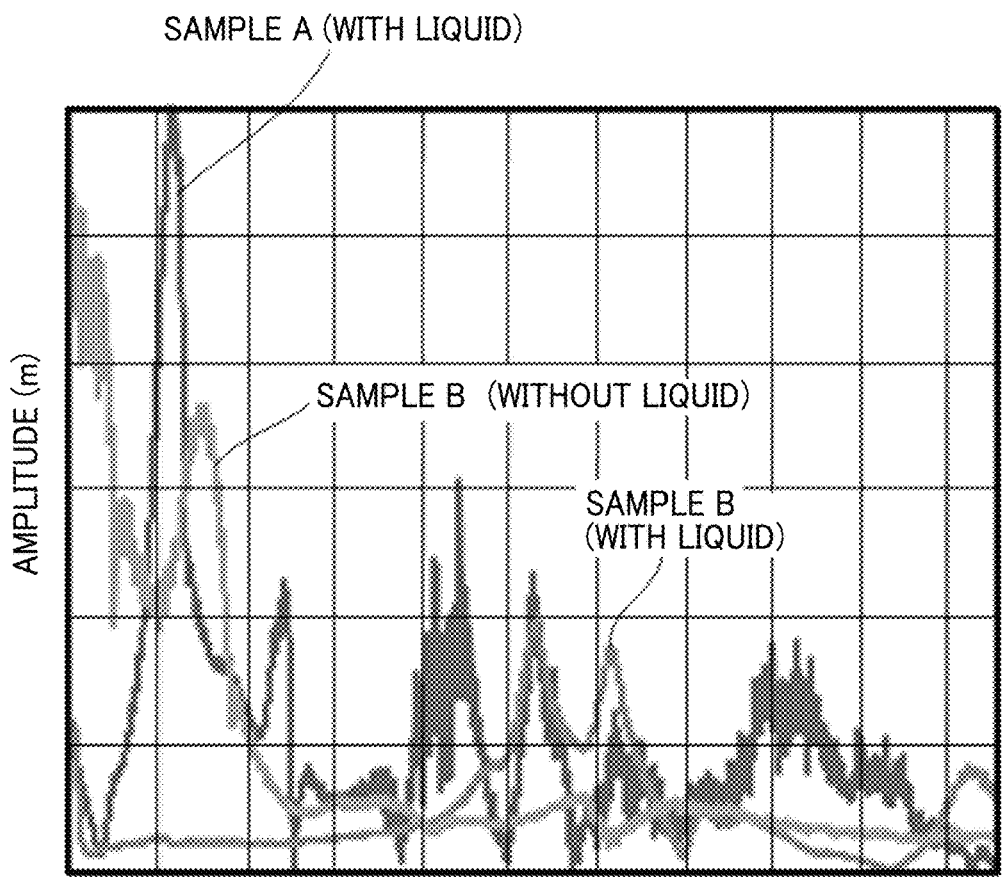
FIG. 5 is a graph of a relation between the vibration frequency and the amplitude for the container body with liquid and without liquid.

FIG. 5 is a graph of the relation between the frequency of the vibration and the amplitude for three samples (i.e., samples A, B, and C). The samples A and B contain the content (i.e., with liquid), but each shape of the container body is different. The sample C does not contain the content (i.e., without liquid) and is comparable to the sample B. In FIG. 5, the maximum frequencies of the vibration for three sample are different from each other in the frequency band (≤15 Hz) accompanied by the deformation of the container body. In the fourth embodiment, by designing the shape or the thickness of the container body, and adjusting the amount of content (e.g., liquid) so that the frequency of the maximum vibration of the container body while conveying is at least one of v/L or less or v/(u/3) or more, the human eye is hard to recognize the image density variation, and the image is formed without impairing the visibility of information and the design property.

Fifth Embodiment

Figure 6:
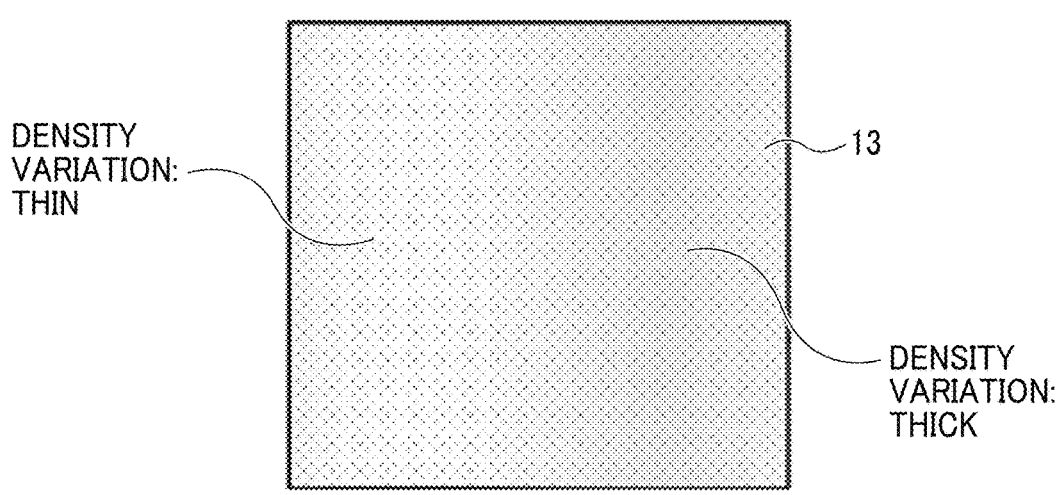
FIG. 6 is a diagram of an image fed on the container body to aim at a uniform image density in the case where the frequency of larger vibration is v/L according to a fifth embodiment.

FIG. 6 is a diagram of a portion of the container body having a formed image (a printed image) according to the fifth embodiment. The formed imaged on the container body is aimed at a uniform image density in a case where the frequency of the larger vibration is v/L. In the container body according to the fifth embodiment, the frequency of the larger vibration of the container body is v/L, and the image is formed aiming at a uniform image density. The formed image has one portion in which the density variation is thin and the other portion in which the density variation is thick.

Sixth Embodiment

Figure 7:
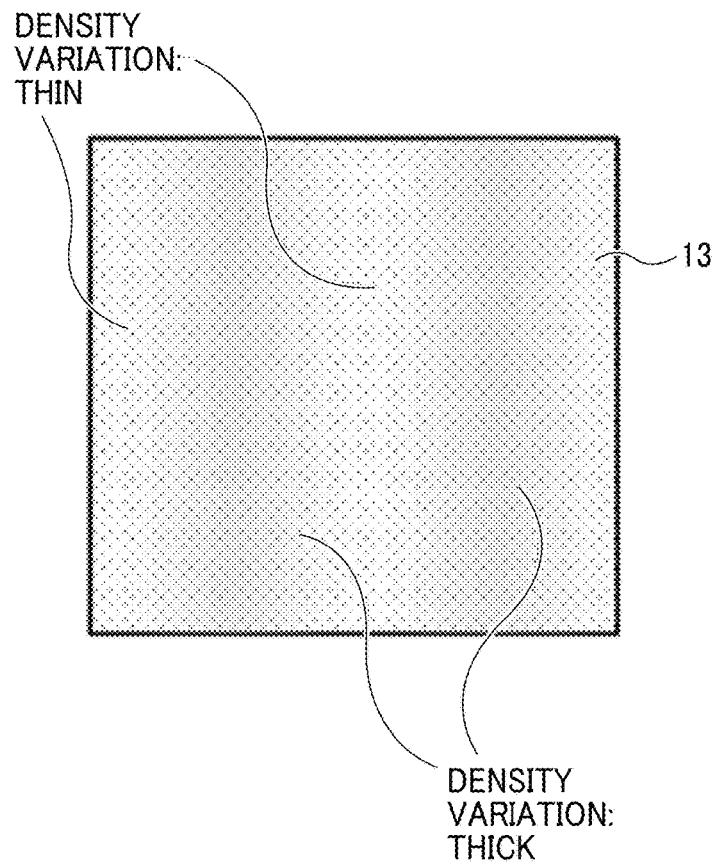
FIG. 7 is a diagram of an image formed on the container body to aim at a uniform image density in the case where the frequency of the larger vibration is twice of v/L according to the sixth embodiment.

FIG. 7 is a diagram of a portion of the container body having a formed image according to the sixth embodiment. The formed image is aimed at a uniform image density in a case where the frequency of the larger vibration is twice of v/L. In the container body according to the fifth embodiment, the frequency of the larger vibration of the container body is larger than v/L. Since the density variation occurs in a shorter cycle less than one, a thick density portion and a thin density portion are repeated. Thus, the cycle of the image density variation is noticeable and recognizable.

Seventh Embodiment

Figure 8:
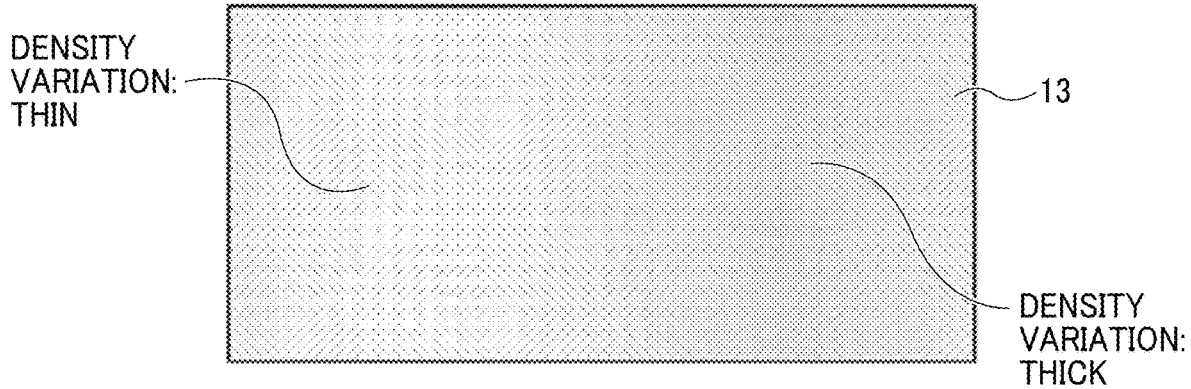
FIG. 8 is a diagram of an image formed on the container body in the case where the processing region is longer in the conveying direction according to a seventh embodiment.

FIG. 8 is a diagram of a portion of the container according to the seventh embodiment in a case where the processing region L in the conveying direction is longer. As in the container body according to the seventh embodiment, when the width of the processing region L in the conveying direction in v/L becomes longer, the cycle of the density variation becomes longer, and the image density variation is hard to visually recognize.

Preferably, the shape of the container body may be designed so as to satisfy the condition of v/L. On the other hand, a holder may be provided to change the vibrational frequency during the laser marking (i.e., image forming or image processing).

Eighth Embodiment

Figure 9:
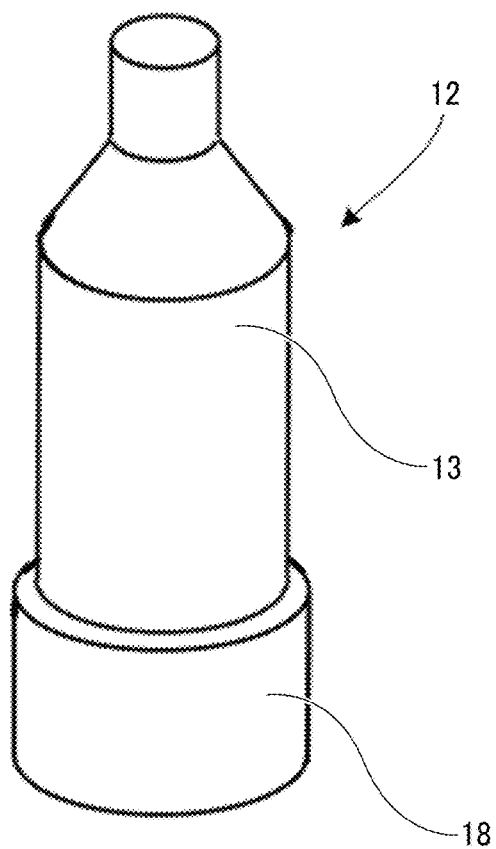
FIG. 9 is a diagram of the holder to hold the container according to the eighth embodiment.

FIG. 9 is a diagram of the holder to hold the container body according to the eighth embodiment. In the eighth embodiment, the bottom portion of the container body 13 is held so as to be covered, and the circumferential surface of the container body is held by the holder 18. Thus, the vibration generated at the circumferential surface of the container body is reduced or prevented, and the larger peak of the vibration is reduced. In addition, since the rigidity of the container body is increased, a frequency (i.e., natural frequency) at which the container body resonates and vibrates due to an external force because rigidity of the container body is increased.

Ninth Embodiment

Figure 10:
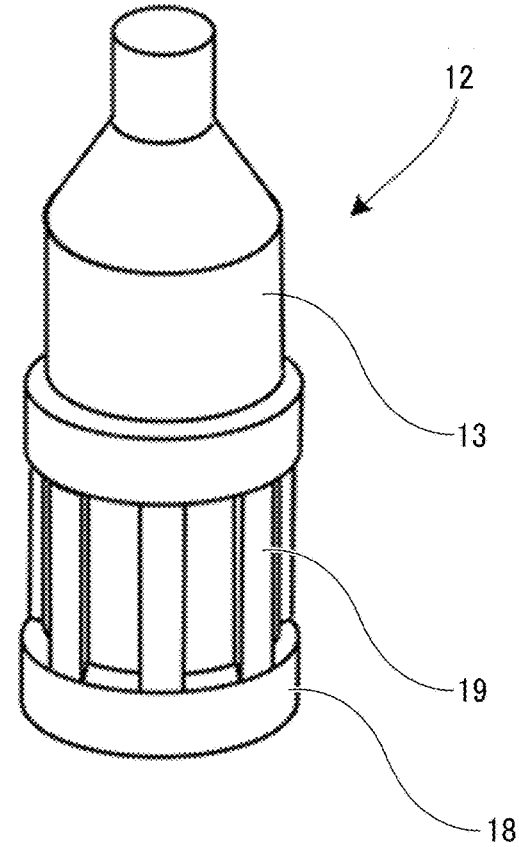
FIG. 10 is a diagram of the contact part provided with the holder to hold the container according to the ninth embodiment.

FIG. 10 is a diagram of the holder 18 and the contact part 19 that hold the container body according to the ninth embodiment. In the ninth embodiment, the contact part 19 is provided at a portion where the amplitude of vibration of the container body is larger as described in the third embodiment together with the holder 18. As a result, the rigidity of the container body is increased while reducing the amplitude of vibration, and the resonance frequency due to an external force is increased. In addition, when the laser marking is performed while rotating the container, the moment of inertia is adjusted by changing the type or the number of the contact parts. Thus, the container body is easy to rotate by driving. In FIG. 10, the holder 18 and the contact part 19 are provided, but only the contact part 19 may be provided.

As described above, the embodiments of the present invention have been described in detail, but the embodiments of the present invention is not limited thereto. Various modifications may be made without departing from the scope of the present invention.

Aspects of the present invention are as follows.

In a first aspect, a laser processing apparatus includes: a conveyor to convey a container containing a content in a container body in a conveying direction at a predetermined conveying speed; a light emitter to emit laser light to a predetermined processing region in the container body conveyed in the conveying direction by the conveyor; and circuitry to control the predetermined conveying speed of the conveyor and the predetermined processing region in the container body to control a frequency of a vibration of the container body, in which an amplitude of the vibration of the container body is maximized, to be v/L or less, where v is the predetermined conveying speed, and L is a length of the predetermined processing region in the conveying direction.

In a second aspect, in the laser processing apparatus according to the first aspect, the circuitry controls the predetermined conveying speed and the predetermined processing region to control the frequency to be v/(u/3) or more, where u is a unit length.

In a third aspect, in the laser processing apparatus according to the first aspect or the second aspect, the vibration of the container body deforms the container body.

In a fourth aspect, the laser processing apparatus according to any of the first aspect to the third aspect, further includes a holder to hold a circumference surface of the container body.

In a fifth aspect, the laser processing apparatus according to the fourth aspect, the holder includes a contact part to contact a portion of the circumference surface of the container body.

In a sixth aspect, a laser processing method includes: conveying a container body containing content in a container in a conveying direction at a predetermined conveying speed of a conveyor; emitting laser light to a predetermined processing region of the container body conveyed by the conveying; and controlling the predetermined conveying speed of the conveyor and the predetermined processing region in the container body to control a frequency of a vibration of the container body, in which an amplitude of the vibration of the container body is maximized, to be v/L or less, where v is the predetermined conveying speed, and L is a length of the predetermined processing region in the conveying direction.

In a seventh aspect, in the laser processing method according to the sixth aspect, the frequency of the vibration of the container body is v/(u/3) or more, where u is a unit length.

In an eighth aspect, in the laser processing method according to the sixth aspect or the seventh aspect, the vibration of the container body deforms the container body.

In a ninth aspect, in the laser processing method according to any one of the sixth aspect to eighth aspect, a laser processing apparatus further includes a holder to hold a circumference surface of the container body.

In a tenth aspect, in the laser processing method according to any one of the sixth aspect to the ninth aspect, the holder includes a contact part to contact a portion of the circumference of the container body, In an eleventh aspect, a container body processed by the laser processing apparatus according to the first aspect has a predetermined processing region processed at a frequency of the vibration of the container body to be v/L or less.

In a twelfth aspect, the container body according to the eleventh aspect further includes a holder to hold a circumference surface of the container body.

In thirteenth aspect, the container body according to the eleventh aspect or the twelfth aspect, the holder includes a contact part to contact a portion of the circumference surface of the container body.

In a fourteenth aspect, a laser processing apparatus includes: a conveyor to convey a container containing a content in a container body in a conveying direction at a predetermined conveying speed; a light emitter to emit laser light to a predetermined processing region in the container body conveyed in the conveying direction by the conveyor; and circuitry to control the predetermined conveying speed of the conveyor and the predetermined processing region in the container body to control a frequency of a vibration of the container body, in which an amplitude of the vibration of the container body is maximized, to be v/L or less, where v is the predetermined conveying speed, and L is a length of the predetermined processing region in the conveying direction In a fifteenth aspect, in the laser processing apparatus according to the fourteenth aspect, the circuitry controls the predetermined conveying speed and the predetermined processing region to control the frequency to be v/(u/3) or more, where u is a unit length.

In a sixteenth aspect, in the laser processing apparatus according to the fourteenth aspect or the fifteenth aspect, the vibration of the container body deforms the container body.

In a seventeenth aspect, the laser processing apparatus according to any of the fourteenth aspect to the sixteenth aspect, further includes a holder to hold a circumference surface of the container body.

In an eighteenth aspect, the laser processing apparatus according to any one of the fourteenth aspect to the seventeenth aspect, the holder includes a contact part to contact a portion of the circumference surface of the container body.

In a nineteenth aspect, a laser processing method includes: conveying a container body containing content in a container in a conveying direction at a predetermined conveying speed of a conveyor; emitting laser light to a predetermined processing region of the container body conveyed by the conveying; and controlling the predetermined conveying speed of the conveyor and the predetermined processing region in the container body to control a frequency of a vibration of the container body, in which an amplitude of the vibration of the container body is maximized, to be v/L or less, where v is the predetermined conveying speed, and L is a length of the predetermined processing region in the conveying direction.

In a twentieth aspect, a container body processed by the laser processing apparatus according to the fourteenth aspect has a predetermined processing region processed at a frequency of the vibration of the container body to be v/L or less.

According to any one of the first aspect to the fifth aspect and the fourteenth aspect to the eighteenth aspect and according to any one of the sixth aspect to the tenth aspect and the nineteenth aspect, the laser processing apparatus and the laser processing method to form an image with higher resolution on a container body that vibrates while forming the image are provided. According to any one of the eleventh aspect to the thirteenth aspect and the twenties aspect, a container body having an image formed by the laser processing apparatus or the laser processing method described above is provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A laser processing apparatus comprising:
   a conveyor configured to convey a container containing a content in a container body in a conveying direction at a predetermined conveying speed; and
   a light emitter configured to emit laser light to a predetermined processing region in the container body conveyed in the conveying direction by the conveyor,
   wherein a frequency of a vibration of the container body conveyed, in which an amplitude of the vibration of the container body is maximized, is v/L or less,
   where v is the predetermined conveying speed, and
   L is a length of the predetermined processing region in the conveying direction.

2. The laser processing apparatus according to claim 1, wherein the frequency is v/(u/3) or more, where u is a unit length.

3. The laser processing apparatus according to claim 1, wherein the vibration of the container body deforms the container body.

4. The laser processing apparatus according to claim 1, further comprising a holder configured to hold a circumference surface of the container body.

5. The laser processing apparatus according to claim 4, wherein the holder includes a contact part to contact a portion of the circumference surface of the container body.

6. A laser processing method comprising:
   conveying a container body containing content in a container in a conveying direction at a predetermined conveying speed of a conveyor; and
   emitting laser light to a predetermined processing region of the container body conveyed by the conveying,
   wherein a frequency of a vibration of the container body conveyed, in which an amplitude of the vibration of the container body is maximized, is v/L or less,
   where v is the predetermined conveying speed, and
   L is a length of the predetermined processing region in the conveying direction.

7. A container body processed by the laser processing apparatus according to claim 1,
   wherein the container body has the predetermined processing region processed at the frequency of the vibration of the container body to be v/L or less.

* * * * *